March 14, 1933. J. SUNNEN Re. 18,763

HONING DEVICE FOR CYLINDERS

Original Filed April 24, 1929 2 Sheets-Sheet 1

INVENTOR:
JOSEPH SUNNEN.

BY Harry A. Beiner
ATTORNEY.

March 14, 1933. J. SUNNEN Re. 18,763

HONING DEVICE FOR CYLINDERS

Original Filed April 24, 1929 2 Sheets-Sheet 2

INVENTOR:
JOSEPH SUNNEN.

BY Harry A. Beimer
ATTORNEY.

Reissued Mar. 14, 1933

Re. 18,763

UNITED STATES PATENT OFFICE

JOSEPH SUNNEN, OF KIRKWOOD, MISSOURI

HONING DEVICE FOR CYLINDERS

Original No. 1,846,371, dated February 23, 1932, Serial No. 357,748, filed April 24, 1929. Application for reissue filed July 15, 1932. Serial No. 622,778.

This invention relates to new and useful improvements in honing or lapping devices for cylinders and is an improvement upon the invention disclosed in my copending application filed November 17, 1927, serial No. 233,788.

Briefly stated, the device to which my invention appertains consists of a rotatable carrier in which are mounted longitudinally disposed cylinder engaging elements. The latter are adjustable radially relative to the axis of rotation in order to compensate for wear and to take care of various sized cylindrical chambers in which the device operates.

As disclosed in the aforesaid application, certain of said cylinder engaging elements are of non-abrasive material and are suitably arranged with respect to the abrasive elements for the purpose of steadying the device during operation and prevent chattering, thereby insuring uniform and efficient operation of the device. Originally, these non-abrasive elements have been made of hard wood but it was found in actual practice that in some cases the wood elements were not entirely satisfactory as the hardness of the wood varied so that said non-abrasive elements would not wear evenly in some instances. Then again, the wood elements did not always have the proper amount of braking action or drag to steady the device and eliminate completely the chatter. Other material, such as fiber, has been experimented with but it was found not quite suitable for the purpose.

It is the primary object of the present invention to provide a honing device having in combination with the usual abrasive elements non-abrasive elements of yieldable hard wearing substance, such as fabric impregnated with rubber, which produces the necessary steadying effect on the device and prevents chattering, and which at the same time has the desired wearing qualities so that said non-abrasive elements do not wear out faster than said abrasive elements.

Further objects of the invention are to provide a non-abrasive cylinder engaging element having a certain degree of resiliency so as to maintain at all times an efficient operating contact between said elements and the cylindrical chamber in which the device operates and which will not become glazed in service but will preserve at all times the proper frictional contact with the cylinder wall.

Another object of the invention is to provide non-abrasive cylinder engaging elements or guides adapted to fit snugly in the cylinder and at the same time be capable of yielding to pressure imposed in operation between the guide and cylinder wall. On account of the resiliency of the non-abrasive guide elements the amount of yield is variable, depending upon the pressure exerted against the guides.

Additional objects of the invention are to provide non-abrasive elements of strips of rubber and fabric which possess the necessary resiliency and wear resisting qualities desirable in the operation of devices of the class described.

With these and other objects in view, my invention consists in certain novel features of construction and arrangement of parts, hereinafter more fully described and claimed, and illustrated in the accompanying drawings, in which:

Figure 1:
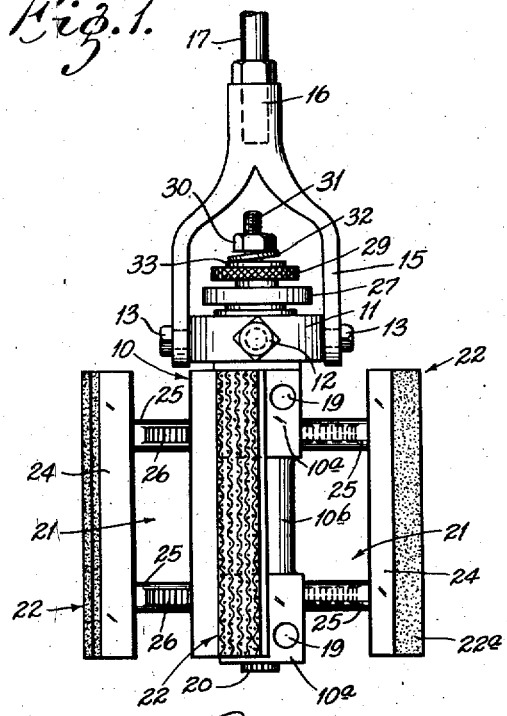
Figure 1 is a side elevational view of my apparatus showing the cylinder engaging elements thereof in extended position.

In my copending application above referred to, I disclose a honing or lapping device designed especially for honing or lapping the cylinders of internal combustion engines, pumps, and the like, but more particularly of automobile and airplane engines. The device is so constructed that it can be readily attached to and operated by an electric hand drill (not shown) which allows easy manipulation of the device and does not require special machining or a great deal of handling of the cylinder blocks. Thus the engine block can be operated upon without the removal thereof from the chassis.

Referring by numerals to the accompanying drawings, 10 indicates a carrier having mounted at one of its ends a ring 11 which is pivotally connected thereto by screws 12. This ring is pivotally supported at points disposed at right angles to screws 12 by screws 13, which are carried by depending spaced ends 15 of a bifurcated member 16. The opposite or upper end of member 16 is secured to the lower end of a spindle 17 which is adapted to be detachably fixed to a suitable actuating mechanism, such as an electric hand drill (not shown) which allows the device to be handled with ease. The carrier 10 comprises an elongated member having enlarged ends $10^a$ and a reduced intermediate portion $10^b$. A bore 18 is disposed centrally and longitudinally through said carrier 10, while a series of transverse bores 19 are arranged in each end $10^a$ of the carrier in spaced relation with each other and with bore 18, each of said bores 19 intersecting said longitudinal bore 18. When carrier 10 occupies vertical position, transverse bores 19 are disposed horizontally at right angles to bore 18. Bores 19 are arranged in pairs, one bore of each pair being disposed in each end $10^a$ with the axes of the bores of each pair disposed in the same vertical plane.

An elongated pinion or revoluble member 20 is loosely disposed in bore 18 and its teeth operate through bores 19 where the latter intersect bore 18. A plurality of mounts 21 is carried by carrier 10 and are movable transversely relative thereto. A cylinder engaging element 22 is secured to each mount 21 and is disposed longitudinally of carrier 10 and adapted to engage the inner surface of the cylinder into which the device is inserted.

Each mount 21 comprises a channel member 24 arranged longitudinally of and adjacent to carrier 10 and a pair of transversely disposed bars 25 movably arranged in the corresponding pair of bores 19, and having their outer ends secured to channel member 24 near the ends thereof. The inner ends of bars 25 are formed with rack portions 26, the teeth of which mesh with the teeth of pinion or revoluble member 20.

In the instant case, carrier 10 is provided with four mounts 21 disposed at right angles to each other with the cylinder engaging elements 22 arranged equidistant about the axis of revoluble member 20.

Thus, when member 20 is rotated in one direction, mounts 21 are moved into extended positions and, when member 20 is moved in opposite direction, said mounts are retracted against carrier 10. In this manner, the cylinder engaging elements 22 can be adjusted radially with respect to the axis of the device, and the range of adjustment of said elements is governed by the length of bars 25. The ends $10^a$ of carrier 10, which are preferably rectangular in cross section, are each of sufficient thickness to provide the necessary bearing for bars 25 so that the latter are securely mounted and have no play or loose movement in said bearings, thereby maintaining cylinder engaging elements 22 at all times in proper alignment with each other and with the axis of the device.

Channel members 24 are disposed to one side of the axis of each bar 25. This offsetting of the channels 24 and elements 22 is designed to place said elements 22 rearwardly of the axis of bars 25 with respect to the direction of rotation of the device, in order to provide uniform engagement between said elements and the cylinder surfaces and prevent wedging or binding action therebetween.

In using this device, it is desirable to steady the same during the operation thereof so as to prevent chattering and binding and the consequent uneven finish of the cylinders. As shown in the drawings, the device is provided with four cylinder engaging elements 22. One pair of the diametrically opposed elements is formed of abrasive material, such as carborundum, as indicated at $22^a$, while the other pair disposed at right angles to the first pair is formed of non-abrasive resilient material, such as fabric impregnated with rubber, or a suitable composition of rubber and fabric, as indicated at $22^b$. The material of these non-abrasive elements is of sufficient hardness and toughness to insure wearing thereof uniformly with the abrasive elements $22^a$. At the same time, due to the nature of the material of which they are made, a sufficient frictional contact is produced to steady the device and prevent chattering or uneven operation thereof.

In using the device, it is highly desirable to provide an accurate adjustment of the elements and to lock said elements in adjusted positions against accidental movement during the operation of the device. Briefly described, this adjustment is obtained by means of an adjusting mechanism 27 located adjacent to the upper end $10^a$ of member 10 and manually operable for actuating, at a greatly reduced rate of speed, revoluble member 20 which actuates arms 25. In the present instance, this adjusting mechanism 27 comprises a train of gears 28 operable by an adjusting member 29. It is not believed that a detail description of the construction and operation of this adjusting mechanism 27 is necessary in the present case as it is fully described and illustrated in the aforesaid application, serial No. 233,788.

The adjusting member 29 is held in position by means of a member 30 which is secured on an extension 31 of pinion 20. A spring, such as a spring washer 32, is interposed between member 30 and said adjusting member 29. Thus a suitable degree of pressure is exerted against said adjusting member 29 to maintain the latter and gearing 27 in proper relation.

While arms 29 are freely movable in and out of member 10 by the actuation of adjusting member 29, said arms are locked against inward movement under the radial pressure applied to the cylinder engaging elements, so that no accidental displacement of said elements can take place and the device will remain in its adjusted position at all times.

The location of the adjusting mechanism is such that it can be readily reached by the operator, and it is not necessary to either remove the device from the hand drill to which it is connected, or to move the device away from the job for purposes of adjustment as such adjustment can be readily made on the job.

The abrasive elements 22[a] are secured in position in channels 24 in any suitable manner. The non-abrasive elements 22 are preferably held in position by crimping or bending one edge of the channel so that said edge crimps the element.

The resilience of the non-abrasive guide elements introduces an available clearance between guides and cylinder wall to prevent binding or appreciable slowing up of the grinder during the operation thereof. By the term "clearance" I mean either clear space or a yielding contact between the non-abrasive guide elements and the cylinder wall in contradistinction to the non-yielding contact of the abrasive elements with the cylinder wall, essential to a rapid abrading action. I have found in practice that the cutting speed of the abrasive members is proportional, between certain limits, to the clearance (in the sense of the amount of movement permitted) between the guides and the cylinder wall. It is possible for there to be so much free, or space, clearance that the abrasive action becomes negligible. By mounting the guide elements in a manner that they will yield to the pressure imposed on them by contact with the cylinder wall, it should be apparent that their contacting surfaces will wear down more rapidly the greater this pressure becomes, and as they wear down the pressure is relieved so that it ultimately becomes balanced with the wear both on the guides and abrasive elements. It is in effecting this balance that the spring mounting of the guides, shown in Figs. 7 and 8 and hereinafter described, is particularly advantageous as there is not sufficient resilience in the material of the guides to produce the most advantageous results.

Obviously, the abrasive elements must fit snugly into the cylinder if they are to be effective in reducing the wall surface, and they should resist the pressure caused by their frictional contact with the wall. However, the guides should not fit as closely as the abrasive elements and instead of resisting, they should yield to pressure caused by frictional contact. The function of the guides is not to control the action of the abrasive elements, but to steady them and maintain them parallel with the axis of the cylinder so as to re-shape the cylinder into true cylindrical form. This function is realized without impairing the speed with which the grinding is accomplished because of the variable clearance on the guides. The greater the pressure imposed on any guide at a given moment, the more this guide will yield until the pressure is released. Thus the speed and abrading action of the grinder is not retarded.

Figure 7:
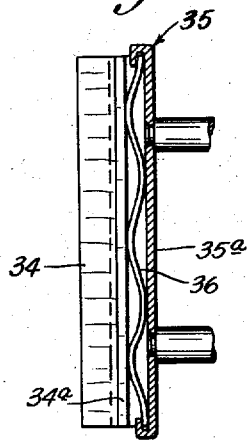
Figure 7 is a vertical section through one of the channel members and showing a non-abrasive element yieldingly mounted therein.
Figure 2:
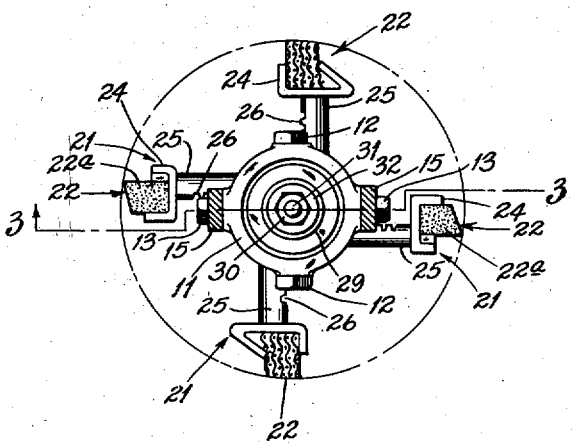
Figure 2 is a top plan view thereof.
Figure 8:
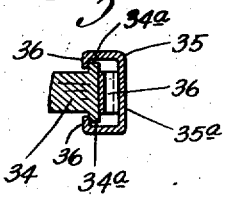
Figure 8 is a horizontal cross section through the same.
Figure 3:
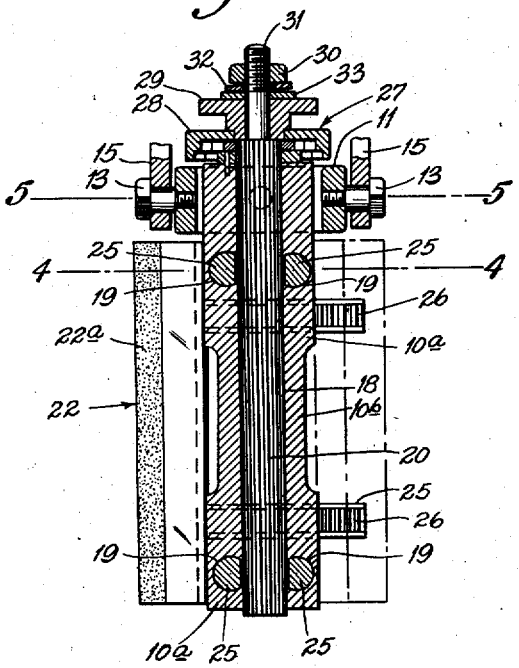
Figure 3 is an enlarged vertical cross section taken on line 3—3 of Figure 2.
Figure 6:
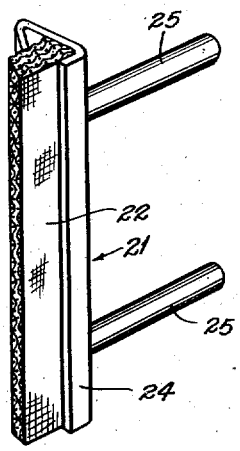
Figure 6 is an enlarged perspective detail view of one of the mounts and showing one of the non-abrasive cylinder engaging elements disposed therein.
Figure 4:
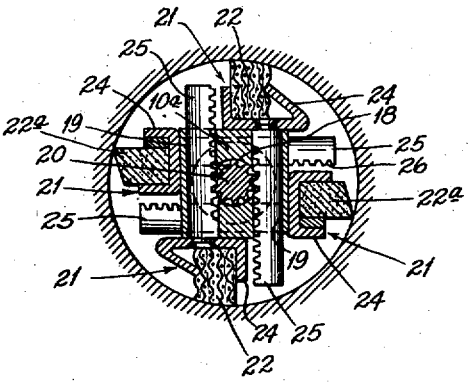
Figure 4 is a horizontal cross section taken on line 4—4 of Figure 3.
Figure 5:
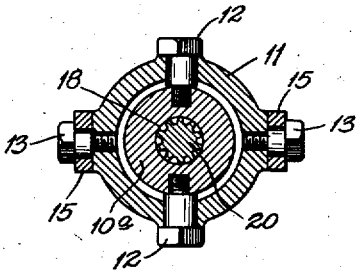
Figure 5 is a horizontal cross section taken on line 5—5 of Figure 3.

In the modified form shown in Figures 7 and 8, a non-abrasive element 34 is yieldably mounted in channel 35 by means of a sinuous spring member 36. This spring has a plurality of spaced contacts with the back of element 34 and with end wall 35[a] of channel 35 and holds said element in extended position and permitting retracting movement thereof. Preferably the ends of the spring are anchored to channel member 35 as shown.

To prevent undue outward movement of element 34 the latter has extensions 34[a] engageable by projections or flanges 36 of channel 35.

In the operation of my device, spindle 17 is moved in a vertical plane so as to bring the cylinder engaging elements in contact with the entire surface of the cylinder, thereby insuring even finish of the cylinder. The use of elements 22 of non-abrasive material arranged between abrasive elements 22[b] steadies the device and eliminates chattering. This greatly increases accuracy and smooth operation of the device.

My improved honing device is of compact and durable construction, and is highly efficient in operation.

While I have shown and described the preferred form of my invention, it is obvious that the invention may be embodied in other specific forms without departing from the spirit thereof.

I claim:

1. An apparatus of the class described comprising a revoluble carrier, mounts carried thereby and movable transversely thereof, cylinder engaging elements of abrasive material carried by certain of said mounts, cylinder engaging elements of non-abrasive elastic material carried by certain other of said mounts, all of said elements being disposed longitudinally of the axis of rotation and spaced equidistant thereabout, and means for actuating all of said mounts and adjusting all of said elements radially of said axes.

2. An apparatus of the class described comprising in combination with a revoluble carrier, of a plurality of cylinder engaging elements carried thereby in spaced relation with each other and longitudinally of the axis of rotation, certain of said elements being formed of abrasive substance, and certain other of said elements being formed of a composition of rubber of suitable hardness and of suitable reinforcing pliable material.

3. An apparatus of the class described comprising a revoluble carrier, and a plurality of cylinder engaging elements carried thereby and disposed longitudinally of the axis of rotation, certain of said elements being formed of abrasive material, and certain other of said elements being formed of a composition of rubber and fabric to provide non-abrasive elements spaced with respect to said abrasive elements for steadying the operation of the apparatus and prevent chattering thereof.

4. In a honing device, the combination with a revoluble carrier and a plurality of mounts carried thereby, of a series of cylinder engaging elements of abrasive material carried by certain of said mounts, and a series of cylinder engaging elements of reinforced rubber arranged in certain other of said mounts, said last mentioned elements having a comparatively large surface contact with the cylinder surface.

5. In a honing device, the combination with a revoluble carrier, a series of cylinder engaging elements of abrasive material, and a series of cylinder engaging elements of non-abrasive material, said last-mentioned elements being formed of a composition of fabric and rubber, the fabric being disposed radially with respect to the cylinder surface.

6. In a honing device, a mount therefor provided with an outwardly presented longitudinal seat and rearwardly and transversely extending rack portions, a non-abrasive cylinder engaging element secured in said seat and comprising an elongated strip of rubber of suitable thickness.

7. In a honing device, a mount comprising an outwardly presented channel member, and a pair of rack portions fixed to and extending rearwardly and transversely from said channel member and a non-abrasive cylinder engaging element secured in said channel and comprising a strip of rubber of suitable hardness and reinforced with suitable pliable material.

8. In a honing device, a mount therefor comprising in combination a longitudinally disposed outwardly presented channel member, a pair of spaced rack portions fixed to said channel member and extending rearwardly and transversely therefrom and a cylinder engaging element secured in said channel, said element comprising an elongated strip composed of rubber, and a plurality of layers of fabric embedded in said rubber and disposed radially with respect to the cylinder surface.

9. In a honing device, the combination of a revoluble carrier, a series of mounts adjustably carried thereby, a plurality of cylinder engaging elements of abrasive material carried by certain of said mounts, a plurality of non-abrasive cylinder engaging elements carried by certain other of said mounts, said non-abrasive elements consisting of strips of rubber, and a plurality of layers of fabric embedded therein, and means for adjusting said mounts.

10. In a honing device, the combination with a revoluble carrier, of a series of mounts carried thereby, a series of abrasive elements fixedly arranged in certain of said mounts, and a series of non-abrasive elements of rubber mounted in certain other of said mounts.

11. In a honing device, the combination of a revoluble carrier, a plurality of mounts carried thereby, a series of abrasive cylinder engaging elements carried by certain of said mounts, and a series of cylinder engaging elements of reinforced rubber carried by certain other of said mounts.

12. In a honing device, a mount therefor comprising a vertically disposed outwardly presented channel member and a pair of rack portions secured to and extending transversely and rearwardly therefrom, and a non-abrasive element of rubber having embedded therein a plurality of flexible woven material disposed in said channel member with said flexible reinforcing material arranged radially with respect to the axis of rotation.

13. In a cylinder honing device, a revoluble carrier, a plurality of cylinder abrading elements arranged in opposition and supported by the carrier and rigidly mounted with respect to the cylinder wall, a plurality of guide elements arranged in opposition and supported by the carrier and yieldingly mounted with respect to the cylinder wall.

14. A honing device comprising a revoluble carrier, mounts supported thereby in circumferentially spaced relation, rigidly mounted abrasive elements and yieldingly mounted non-abrasive elements carried respectively by alternate mounts.

15. In a honing device, a mount comprising an outwardly presented channel member, and a strip of resilient material secured therein and extending therefrom for engagement with the cylinder surface.

16. In a honing device, a mount having a longitudinally disposed seat, and a non-abrasive cylinder engaging element secured therein and consisting of a strip of resilient material.

17. In a cylinder honing device, a revoluble carrier, rigidly mounted abrasive elements supported by the carrier and arranged to rotate over the cylinder surface, and resiliently mounted non-abrasive elements supported by the carrier and arranged for rotation over the cylinder surface, said non-abrasive elements comprising guides for controlling the action of the abrasive elements.

18. In a cylinder honing device, a revoluble carrier, a plurality of cylinder contacting elements supported by the carrier and arranged in circumferentially spaced relation, alternate elements comprising abrasive stones mounted for non-yielding contact with the cylinder wall, and alternate elements comprising non-abrasive guides mounted for yielding contact with the cylinder wall.

19. In a cylinder honing device, a revoluble carrier, a plurality of cylinder contacting elements supported by the carrier and arranged in circumferentially spaced relation, some of said elements comprising abrasive stones mounted for non-yielding contact with the cylinder wall, and some of said elements comprising non-abrasive guides mounted for yielding contact with the cylinder wall.

In testimony whereof I hereunto affix my signature.

JOSEPH SUNNEN.